Patented Sept. 19, 1950

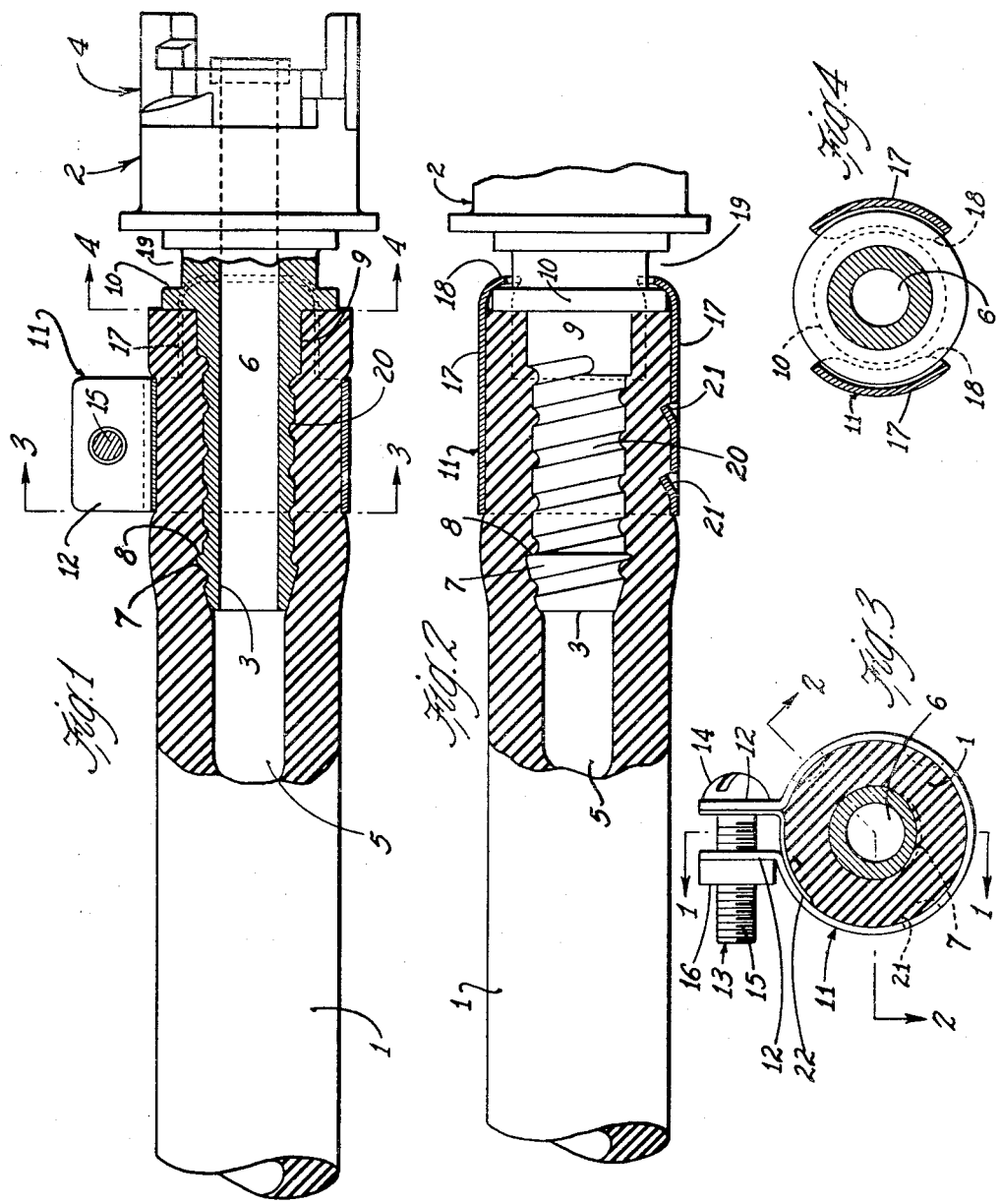

2,522,684

UNITED STATES PATENT OFFICE 2,522,684

HOSE SECURING MEANS

Walter G. Mitchell, Aurora, Ill., assignor to Independent Pneumatic Tool Company, Chicago, Ill., a corporation of Delaware Application February 16, 1946, Serial No. 648,064

2 Claims. (Cl. 285—84)

This invention relates to improvements in means for more securely securing flexible pneumatic or compressed air or other fluid conveying hose to metal or other rigid hose coupling or equivalent members.

The invention consists in providing a small bulbous or enlarged section on the exterior of the shank of the metal coupling member at or adjacent its outer end to form a shoulder or knot back of the hose clamp which clamps the hose on the shank between the coupling member and the enlargement to assist in more securely retaining the shank in the bore of the hose against an outward pull or displacement by the pressure within the hose.

A further object of my invention consists in having the spiral thread-like groove or embossment along the outer surface of the shank of the coupling member continue uninterruptedly through the enlarged section on the shank to assist in guiding the shank into the bore of the hose section with a screwing action in inserting the shank into the bore of the hose section and have the hose material take into the groove with a keying fit on opposite sides of and through the enlarged section for hose securing purposes.

The invention consists further in the structural features and combination of parts hereinafter described and claimed.

In the accompanying drawings—

Fig. 1 is a longitudinal sectional view taken on line 1—1 of Fig. 3 showing a pneumatic hose section applied on the shank of a metal coupling member and secured thereto in accordance with my invention;

Fig. 2 is a similar sectional view taken on line 2—2 of Fig. 3 with the shank of the coupling member in elevation to more clearly show the enlarged section on said shank;

Fig. 3 is a transverse sectional view taken on line 3—3 of Fig. 1; and

Fig. 4 is a similar sectional view taken on line 4—4 of Fig. 1.

In the drawings, I have shown a flexible pneumatic hose section 1 comprised of rubber with an embedded fabric material as used for conveying compressed air to portable pneumatic tools and other pneumatically operated devices. 2 indicates a metal or other coupling member having a shank 3 and a connected head portion 4, the shank 3 being inserted into the bore 5 of the hose section and secured therein by the clamping means of my invention. The head portion 4 is fashioned to releasably interconnect with a complementary head portion of a mating coupling member for connecting one hose section to another as well understood in this art. The shank 3 and its head portion 4 are provided with a continuous air flow passage 6 extending therethrough to convey the pressure fluid from one hose section to the other.

The shank 3 of the coupling member 2 in accordance with my invention is provided with an external bulbous or enlarged section 7 at or adjacent its outer end and which enlargement 7 is preferably integral with the shank portion and projects radially therefrom or substantially so beyond the body of the shank portion to provide a rigid shoulder 8 facing the head portion 4 of the coupling as shown in Figs. 1 and 2. In the specific embodiment illustrated, the enlarged section 7 extends substantially about the shank portion 3 with the shank portion of a slightly reduced and substantially uniform diameter between the shoulder 8 and the portion 9 of the coupling member at its surrounding external flange 10 which fits against the hose end and limits the extent to which the shank may be extended or inserted into the hose section 1.

The shank 3 is made long enough to provide an extended bearing surface for the hose section 1 and to space the enlargement 8 rearwardly or inwardly from the sheet metal hose clamp 11 which clamps the hose section on the shank portion 3 between the shoulder 8 and the flange 10 of the coupling member 2. This clamp 11 is of the split or divided type of the desired relatively stout gauge and is provided at its spaced ends with a pair of outwardly projecting flanges 12, 12 to be engaged by a clamping screw 13 with its head 14 at one flange and its threaded stem 15 extending through the other flange and receiving a clamp nut 16 for tightening the body member of the clamp about the hose section 1. The body portion of the clamp has a pair of laterally extending integral wings or arms 17, 17 to engage at their inwardly directed outer ends 18 over the flange 10 on the coupling member 2 as shown in Figs. 1, 2 and 3. The inwardly directed ends 18, of the arms 17 take into a groove or space 19 forwardly of the flange 10 as shown.

The tension of the screw 13 clamps the hose section 1 about the shank portion 3 with the flexible hose material keyed in the spiral groove 20 with which the shank is provided along its outer surface. This groove 20, in accordance with my invention, is continued uninterruptedly through the enlargement 7 and the hose material fits in the groove on opposite sides of the enlargement to assist in retaining the shank portion 3 of the coupling member within the bore of the hose and against outward displacement by pressure within the hose or otherwise.

It will be noted that the enlargement 7 is beyond the adjacent side of the hose clamp 11 and forms a knot back of the clamp member 11 to aid in retaining the shank 3 within the bore of the hose. This bore is initially made slightly smaller than the outside diameter of the shank portion 3 so that forcing the shank portion into the bore with a turning movement causes the hose material to follow and embed itself in the spiral groove 20 along the length thereof as herein shown. Moreover, with the groove 20 continued through the enlargement 7, the latter serves to guide the hose on the shank with a screw-like action and facilitates the application of the shank into the bore of the hose section 1.

The hose securing means of my invention is simple and inexpensive in construction and in combination with the hose clamp member 11 more securely secures the shank portion of the coupling or equivalent member within the bore of the hose section. The clamping member 11 may be provided with a number of inwardly pressed tangs 21, 21 to embed themselves into the hose material for fastening purposes as shown in Fig. 2. The hose clamp 11 has a filler piece 22 which closes the gap between the flanges 12.

The details of construction and arrangement of parts shown and described may be variously changed and modified without departing from the spirit and scope of my invention, except as pointed out in the annexed claims.

I claim as my invention:

1. A coupling member of the character described comprising a tubular shank adapted to be inserted into the bore of a flexible hose, a head portion at one end of said shank, and a radially extending enlargement of greater diameter than said shank and disposed a slight distance inwardly from the opposite end of the shank whereby to provide a shoulder for increased retention of the shank within the hose when the hose is clamped intermediate said enlargement and said head portion, said shank being formed with a continuous spiral groove extending along its length and continuing through said enlargement to said opposite end of the shank for facilitating twisting insertion of said shank into the bore of the hose whereby to effect embedding of the hose material in the shank and enlargement.

2. In combination, a flexible hose, a coupling member for said hose comprising a head portion and an elongated tubular shank extending into the bore of the hose, said shank having a radially extending enlargement of greater diameter than the shank and disposed a slight distance from the inner end of the shank and said shank being formed with a continuous spiral groove extending along its length and continuing through said enlargement to said inner end of the shank for facilitating twisting insertion of said shank and said enlargement into the bore of the hose, and clamping means fitted around said hose intermediate said head portion and said enlargement, said enlargement being spaced longitudinally from said clamping means whereby said hose is securely retained on said shank by compression of the hose between said head portion and said enlargement.

WALTER G. MITCHELL.

REFERENCES CITED

The following references are of record in the file of this patent:

UNITED STATES PATENTS

| Number | Name | Date |
|---|---|---|
| 431,167 | Jones | July 1, 1890 |
| 1,786,489 | Hopkins | Dec. 30, 1930 |

FOREIGN PATENTS

| Number | Country | Date |
|---|---|---|
| 574,612 | France | Apr. 3, 1924 |